(12) United States Patent
Yuan et al.

(10) Patent No.: US 8,675,717 B1
(45) Date of Patent: Mar. 18, 2014

(54) RATE SELECTION IN A COMMUNICATION SYSTEM

(71) Applicant: Google Inc., Mountain View, CA (US)

(72) Inventors: Yuan Yuan, Sunnyvale, CA (US); C. Philip Gossett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/652,819

(22) Filed: Oct. 16, 2012

Related U.S. Application Data

(60) Provisional application No. 61/624,667, filed on Apr. 16, 2012.

(51) Int. Cl.
*H04B 1/38* (2006.01)

(52) U.S. Cl.
USPC .......... 375/219; 375/260; 375/262; 375/265; 375/267; 375/340; 375/343; 375/346; 375/350

(58) Field of Classification Search
USPC ......... 375/219, 260, 262, 265, 267, 340, 343, 375/346, 347, 350; 370/203, 204, 205, 207, 370/208, 209, 210
See application file for complete search history.

(56) References Cited

U.S. PATENT DOCUMENTS

| 7,269,139 | B1 | 9/2007 | Williams, Jr. et al. |
|---|---|---|---|
| 7,515,538 | B2 | 4/2009 | Gefflaut et al. |
| 7,586,655 | B1 | 9/2009 | Uhlik et al. |
| 7,605,844 | B1 | 10/2009 | Page et al. |
| 7,619,784 | B1 | 11/2009 | O'Sullivan et al. |
| 7,639,406 | B1 | 12/2009 | Proudfoot et al. |
| 8,203,940 | B1 | 6/2012 | Yuan et al. |
| 8,559,455 | B1 * | 10/2013 | Yuan et al. ............ 370/444 |
| 2002/0065063 | A1 | 5/2002 | Uhlik et al. |
| 2002/0114287 | A1 | 8/2002 | Gupta et al. |
| 2002/0147019 | A1 | 10/2002 | Uhlik et al. |
| 2002/0155818 | A1 | 10/2002 | Boros et al. |
| 2003/0026220 | A1 | 2/2003 | Uhlik et al. |
| 2003/0028649 | A1 | 2/2003 | Uhlik et al. |
| 2003/0032423 | A1 | 2/2003 | Boros et al. |
| 2003/0050016 | A1 | 3/2003 | Boros et al. |
| 2003/0086371 | A1 | 5/2003 | Walton et al. |

(Continued)

OTHER PUBLICATIONS

Chang and Liu, "Optimal Channel Probing and Transmission Scheduling for Opportunistic Spectrum Access." IEE/ACM Transaction on Networking, vol. 17, No. 6, Dec. 2009; 14 pages.

(Continued)

*Primary Examiner* — Dhaval Patel
(74) *Attorney, Agent, or Firm* — Fish & Richardson P.C.

(57) ABSTRACT

In general, the subject matter described in this disclosure can be embodied in methods, systems, and program products for adapting data rate. The method includes receiving a data transmission at a data rate, identifying a first quantity of packets that were not adequately received, and using the first quantity to increase a packet loss level. A second quantity of improper bits in those packets that were adequately received at the data rate are identified, and the second quantity is used to increase a bit error level. As a result of having determined that the first value does not satisfy a first criterion for reducing the rate of the data transmission and that the second value does satisfy a second criterion for increasing the rate of the data transmission, an instruction is sent for causing the sending device to increase the rate of the data transmission.

19 Claims, 7 Drawing Sheets

(56) References Cited

U.S. PATENT DOCUMENTS

| | | |
|---|---|---|
| 2003/0169722 A1 | 9/2003 | Petrus et al. |
| 2004/0062211 A1 | 4/2004 | Uhlik |
| 2004/0062226 A1 | 4/2004 | Uhlik |
| 2004/0062276 A1 | 4/2004 | Uhlik et al. |
| 2004/0063450 A1 | 4/2004 | Uhlik |
| 2004/0063465 A1 | 4/2004 | Uhlik |
| 2004/0127260 A1 | 7/2004 | Boros et al. |
| 2004/0264699 A1 | 12/2004 | Meandzija et al. |
| 2004/0268126 A1 | 12/2004 | Dogan et al. |
| 2005/0169178 A1 | 8/2005 | Gupta et al. |
| 2006/0125782 A1 | 6/2006 | Orchard et al. |
| 2006/0215561 A1 | 9/2006 | Wang et al. |
| 2007/0021930 A1 | 1/2007 | Uhlik |
| 2007/0042752 A1 | 2/2007 | Uhlik et al. |
| 2007/0042753 A1 | 2/2007 | Uhlik et al. |
| 2007/0049299 A1 | 3/2007 | Uhlik |
| 2007/0112948 A1 | 5/2007 | Uhlik |
| 2007/0121849 A1 | 5/2007 | Uhlik et al. |
| 2007/0133496 A1 | 6/2007 | Barratt et al. |
| 2007/0153010 A1 | 7/2007 | Uhlik |
| 2007/0294395 A1 | 12/2007 | Strub et al. |
| 2011/0235516 A1 | 9/2011 | Roy et al. |
| 2011/0273985 A1 | 11/2011 | Siemens et al. |
| 2013/0028088 A1* | 1/2013 | Do et al. ................. 370/235 |

OTHER PUBLICATIONS

Chiang et al., "Power Control in Wireless Cellular Networks", Foundations and Trends® in Networking Sample, vol. X Issue Y, 2008, 168 pages.

Sadeghi et al., "Opportunistic Media Access for Multirate Ad Hoc Networks." ACM MobiCom, Atlanta, GA, Sep. 2002; 12 pages.

Tan et al., "Solving Nonconvex Power Control Problems in Wireless Networks: Low SIR Regime and Distributed Algorithms", Department of Electrical Engineering, Princeton University, 2005, 7 pages.

Wong et al., "Robust Rate Adaptation for 802.11 Wireless Networks." ACM MobiCom, 2006; 12 pages.

* cited by examiner

RATE SELECTION IN A COMMUNICATION SYSTEM

CROSS-REFERENCE TO RELATED APPLICATIONS

This application claims priority to U.S. Provisional Application Ser. No. 61/624,667, filed on Apr. 16, 2012, the entire contents of which are hereby incorporated by reference.

TECHNICAL FIELD

This document generally relates to communication systems.

BACKGROUND

Modern wireless data communication systems provide bandwidth for use by computing applications on mobile devices. For example, users of wireless devices such as smart phones can make telephone calls, receive emails, and even receive full-motion audio/video broadcasts on their mobile devices. New services are offered, and, in response, users of wireless devices consume data associated with the service, requiring more and more bandwidth. As a result, the airwaves are filled with data going to and from an increasing number of wireless computing devices that each use growing amounts of data.

A data packet transmitted in a wireless communication system may not always be received by a designated recipient computing device. Interfering signals from other computing devices or from natural phenomena may overpower the portion of the signal that includes the data packet so that the entire data packet, or portions thereof, are unintelligible to the receiving device or include errors. Similarly, the transmitting device or the receiving device may move behind an obstruction, so that communication signals between the devices are inhibited for a temporary period of time.

The electromagnetic spectrum that wireless devices use for wireless communication is treated as a precious resource. Governments control where in the spectrum particular wireless technologies can operate, and also control who can use particular portions of the spectrum (e.g., through high-cost spectrum auctions). Thus, various mechanisms are used to maximize the data that a network of wireless devices and corresponding base stations can exchange in a particular portion of spectrum. Interfering signals may create fewer errors at reduced data rates than at higher data rates. Accordingly, a communication system may transmit at higher data rates when less interference is detected, and at lower data rates when more interference is detected.

SUMMARY

This document describes techniques, methods, systems, and mechanisms for performing rate selection in a communication system. In general, a receiving device in a communication system may control, at least in part, the rate at which a sending device transmits data to the receiving device. The receiving device may analyze a quality of the data communication, for example, by calculating a packet loss count and a bit error count for the current rate of the data transmission. The receiving device may analyze the packet loss count and bit error count to determine whether to request that the transmitting device increase the rate of the data communication, decrease the rate of the data communication, or indicate that the rate of the data communication remain at the current rate.

As additional description to the implementations described below, the present disclosure presents the following implementations:

Implementation 1 is a computer-implemented method for adapting data rate in a communication system. The method includes receiving, by a receiving computing device, at least a portion of a data transmission that a sending device transmitted at a first data rate. The method includes identifying, by the receiving computing device, a first quantity of packets in the data transmission that the receiving computing device did not adequately receive at the first data rate, and using the first quantity to increase a packet loss level for the first data rate, the packet loss level for the first data rate identifying a level of packets at the first data rate that the receiving computing device did not adequately receive. The method includes identifying, by the receiving computing device, a second quantity of improper bits in those packets in the data transmission that the receiving computing device adequately received at the first data rate, and using the second quantity to increase a bit error level for the first data rate, the bit error level for the first data rate identifying a level of bits at the first data rate that have been identified as being improper. The method includes determining, by the receiving computing device, whether a first value that is based on the packet loss level for the first data rate satisfies a first criterion for reducing the rate of the data transmission. The method includes determining, by the receiving computing device, whether a second value that is based on the bit error level for the first data rate satisfies a second criterion for increasing the rate of the data transmission. The method includes, as a result of having determined that the first value does not satisfy the first criterion and that the second value does satisfy the second criterion, sending, by the receiving computing device and for receipt by the sending device, an instruction for causing the sending device to increase the rate of the data transmission.

Implementation 2 is the method of implementation 1, further comprising clearing, by the receiving computing device, the packet loss level for the first data rate and the bit error level for the first data rate after receiving at least a portion of the data transmission at the increased rate of the data transmission.

Implementation 3 is the method of implementations 1 or 2, wherein the first value comprises a first proportion of the packet loss level at the first data rate to a quantity of packets in the data transmission at the first data rate.

Implementation 4 is the method of implementation 3, wherein the first criterion is satisfied by the first value being greater than a first threshold value, and is not satisfied by the first value being less than the first threshold value.

Implementation 5 is the method of implementation 4, wherein the first proportion does not account for information associated with packets that exceed a certain age.

Implementation 6 is the method of any one of implementations 1 through 5, wherein: the second value comprises the bit error level; and the second criterion is satisfied by the second value being less than a second threshold value and is not satisfied by the second value being greater than the second threshold value.

Implementation 7 is the method of implementation 6, wherein the bit error level does not account for information associated with packets that exceed a certain age.

Implementation 8 is a computer-implemented method for adapting data rate in a communication system. The method includes receiving, by a receiving computing device, at least a portion of a data transmission that a sending device transmitted at a first data rate. The method includes identifying, by the receiving computing device, a first quantity of packets in the data transmission that the receiving computing device did not adequately receive at the first data rate, and using the first quantity to increase a first packet loss level for the first data rate, the first packet loss level identifying a level of packets at the first data rate that the receiving computing device did not adequately receive. The method includes identifying, by the receiving computing device, a second quantity of improper bits in those packets in the data transmission that the receiving computing device adequately receive at the first data rate, and using the second quantity to increase a first bit error level for the first data rate, the bit error level for the first data rate identifying a level of bits at the first data rate that have been identified as being improper. The method includes determining, by the receiving computing device, whether a first value that is based on the first packet loss value for the first data rate satisfies a first criterion for reducing the rate of the data transmission. The method includes, as a result of having determined that the first value satisfies the first criterion, sending, by the receiving computing device and for receipt by the sending device, an instruction for causing the sending device to decrease the rate of the data transmission. The method includes receiving, by the receiving computing device, at least a portion of the data transmission at a second data rate that is lower than the first data rate. The method includes identifying, by the receiving computing device, a third quantity of packets in the data transmission that the receiving computing device did not adequately receive at the second data rate, and using the third quantity to increase a second packet loss level for the second data rate, the second packet loss level for the second data rate identifying a level of packets at the second data rate that the receiving computing device did not adequately receive. The method includes identifying, by the receiving computing device, a fourth quantity of improper bits in those packets in the data transmission that the receiving computing device adequately received at the second data rate, and using the fourth quantity to increase a second bit error level for the second data rate, the second bit error level for the second data rate identifying a level of bits at the second data rate that have been identified as being improper. The method includes determining, by the receiving computing device, whether a third value that is based on the second packet loss level for the second data rate satisfies a third criterion for reducing the rate of the data transmission. The method includes determining, by the receiving computing device, whether a fourth value that is based on the second bit error level for the second data rate satisfies a fourth criterion for increasing the rate of the data transmission. The method includes as a result of having determined that the third value does not satisfy the third criterion and that the fourth value does satisfy the fourth criterion, sending by the receiving computing device and for receipt by the sending device, an instruction for causing the sending device to increase the rate of the data transmission.

Implementation 9 is the method of implementation 8, wherein: the first value comprises a first proportion of the first packet loss level to a quantity of packets in the data transmission at the first data rate; the third value comprises a second proportion of the second packet loss level to a quantity of packets in the data transmission at the second data rate; and the fourth value comprises the second bit error level.

Implementation 10 is the method of implementation 9, wherein: the first criterion is satisfied by the first value being greater than a first threshold value and is not satisfied by the first value being less than the first threshold value; and the third criterion is satisfied by the third value being less than a third threshold value and is not satisfied the third value being greater than the third threshold value.

Implementation 11 is the method of implementation 10, wherein the fourth criterion is satisfied by the fourth value being less than a fourth threshold value and is not satisfied by the fourth value being greater than the fourth threshold.

Implementation 12 is a receiving computing device. The receiving computing device includes a data receiver, executable by one or more processors, that is programmed to receive at least a portion of a data transmission that has been provided by a sending device. The receiving computing device includes a transmission monitor, executable by the one or more processors, that is programmed to: (i) increase a packet loss level for a current rate of the data transmission for each packet in the data transmission that the receiving computing device does not adequately receive, and (ii) increase a bit error level for the current rate of the data transmission for each incorrect bit in one or more packets of the data transmission that the receiving computing device adequately received. The receiving computing device includes a rate selector, executable by the one or more processors, that is programmed to: (i) determine whether a first value that is based on the packet loss level for the current rate satisfies a first criterion for decreasing the current rate of the data transmission, and, as a result of a determination that the first value satisfies the first criterion, indicate that the current rate should decrease, and (ii) determine whether a second value that is based on the bit error level for the current rate satisfies a second criterion for increasing the current rate of the data transmission, and, as a result of a determination that the second value satisfies the second criterion, indicate that the current rate should increase. The receiving computing device includes a rate controller, executable by the one or more processors, that is programmed to: (i) receive the indication that the current rate should decrease and as a result provide, for receipt by the sending device, an instruction that the sending device decrease the current rate of the data transmission, and (ii) receive the indication that the current rate should increase and as a result provide, for receipt by the sending device, an instruction that the sending device increase the current rate of the data transmission.

Implementation 13 is the receiving computing device of implementation 12, wherein the rate selector is programmed to indicate that the current rate should increase as a result of a determination that the first value does not satisfy the first criterion and the determination that the second value satisfies the second criterion.

Implementation 14 is the receiving computing device of any one of implementations 12 or 13, wherein: the first value comprises a proportion of the packet loss count for the current data rate to a quantity of packets in the data transmission at the current data rate; and the second value comprises the bit error level for the current data rate.

Implementation 15 is the receiving computing device of implementation 14, wherein: the first criterion is satisfied by the first value being greater than a first threshold value and is not satisfied by the first value being less than the first threshold value; and the second criterion is satisfied by the second value being less than a second threshold value and is not satisfied by the second value being greater than the second threshold value.

Implementation 16 is the receiving computing device of any one of implementations 12 through 15, wherein the receiving computing device is programmed so that, in response to the rate controller including the instruction in the data transmission: (a) the data receiver is programmed to receive the data transmission with the current rate as having either decreased or increased; (b) the transmission monitor is programmed to increase the packet loss level and increase the bit error level for the data transmission with the current rate that has either decreased or increased; (c) the rate selector is programmed to determine whether the first criterion is satisfied and determine whether the second criteria is satisfied; and (d) the rate controller is programmed to provide for receipt by the sending device another instruction that the sending device either decrease or increase the current rate of the data transmission that has already either decreased or increased.

Implementation 17 is the receiving computing device of any one of implementations 12 through 16, wherein the transmission monitor maintains the packet loss level for a sliding window of recent packets for the current rate of the data transmission.

Implementation 18 is the receiving computing device of any one of implementations 12 through 17, wherein the transmission monitor maintains the bit error level for a sliding window of recent packets for the current rate of the data transmission.

Implementation 19 is the receiving computing device of any one of implementations 12 through 18, wherein the current rate of the data transmission is one of multiple rates of the data transmission, wherein the multiple rates of the data transmission specify different quantities of bytes that the receiving device is configured to receive in a packet that is fixed in length of transmission time.

Particular embodiments can be implemented, in certain instances, to realize one or more of the following advantages. For example, a receiving device in a communication system may be able to control the rate at which data is transmitted to the receiving device. The receiving device may make rate adaptation determinations computationally efficiently and quickly using minimal information (e.g., packet loss count and/or bit error count). Thus, the receiving device may perform frequent rate adaptation change requests, and the communication system may dynamically change to channel conditions. For example, if the channel deteriorates, the receiving device is able to request that data is transmitted at a lower rate. As a result, the system may maximize the rate at which data can be transmitted, consistent with varying environmental conditions that affect the allowable rate of data transmission.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
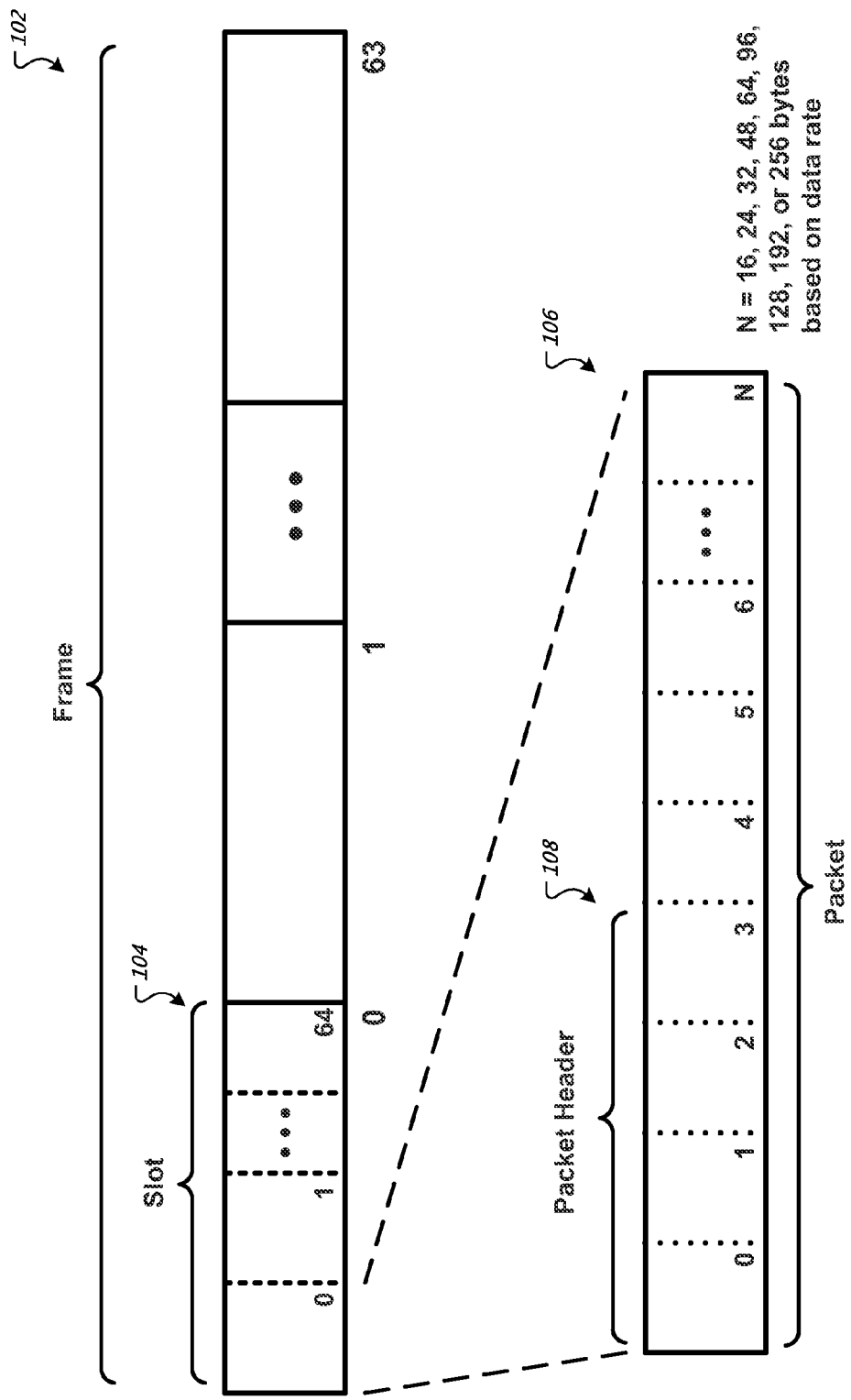
FIG. 1 shows structures for transmitting data in a communication system.

This document generally describes rate adaptation in a communication system. In general, a sending computing device (e.g., a computer, an access point, a router, etc.) in the communication system may transmit data to a receiving computing device (e.g., a desktop, laptop, tablet, or smartphone computer) in the communication system. The data transmission may occur at a particular data rate (e.g., a rate at which data is transmitted by the sending computing device into a medium for receipt by the receiving computing device).

The sending computing device may be configured to send the data at different data rates. The data rate used for a transmission of data may be specified by a recent data rate request that the sending computing device has received from the receiving computing device. For example, if the receiving computing device receives data that includes a significant quantity of errors, the receiving computing device may request that the sending computing device transmit at a reduced data rate. At the reduced data rate, each portion of data may transmit for a longer period of time (the switching may be slower). Thus, interference from third-party communications and natural phenomena may be less likely to introduce errors into each portion of data.

Similarly, if the receiving computing device receives data that does not include a significant quantity of errors, the receiving computing device may request that the sending computing device transmit at an increased data rate. At the increased data rate, each portion of data may transmit for a shorter period of time. Thus, interference may be more likely to introduce errors into each portion of data. The data, however, is transmitted at a higher data rate. As such, the total throughput of data that is received without error (e.g., including data that the receiving computing device is able to decode, even if the data as received includes an error), may be greater at the increased data rate.

The receiving computing device may determine whether to request a decreased rate of data transmission based on a packet loss count of the data transmission, and may determine whether to request an increased rate of data transmission based on a bit error count of the data transmission. For example, if the packet loss count of the data transmission exceeds a threshold value, the receiving computing device may request that the rate of data transmission decrease. If the packet loss count of the data transmission does not exceed the threshold value, and the bit error count falls below a threshold value, the receiving computing device may request that the rate of data transmission increase.

The receiving computing device can request that the rate of data transmission decrease or increase by inserting, into a header of a packet that is communicated to the sending computing device, an instruction to either decrease or increase the rate of the data transmission. The instruction can include a value that specifies the desired rate of the data transmission. The instruction can include a value that specifies that the desired rate of the data transmission increase or decrease. The receiving computing device may request that the rate of data transmission stay the same by either not sending such an instruction, or by sending an instruction that the rate of data transmission remain the same (e.g., a value that specifies the current rate of data transmission).

A packet loss count for a particular rate of transmission may include a running total of a quantity of packets that the receiving computing device did not receive (e.g., as determined using packet sequence numbers) in combination with a quantity of those packets that the receiving computing device received but was unable to decode (e.g., the packet included substantial errors such that the receiving computing device was unable to reconstruct the contents of the original packet). A calculation of the packet loss count may be based on those packets which were recently-received by the receiving computing device or which should have been recently-received by the receiving computing device and the calculation may exclude information from those packets beyond a specified age of receipt by the receiving computing device. The counts may be in the form of an absolute number of packets, a relative number of packets (e.g., a normalized number), a proportion of one type of packet to another (e.g., good packets to bad packets), or other measured level of packets.

A bit error count for a particular rate of transmission may include a running total, from those packets that were received and correctly decoded by the receiving computing device, of bits that were erroneous (also called improper throughout this disclosure). A calculation of the bit error count may be based on bits from packets which were recently-received and decoded by the receiving computing device, and the calculation may exclude information about bits from those packets beyond a specified age of receipt by the receiving computing device.

FIG. 1 shows structures for transmitting data in a communication system. In particular, the communication system may use Time Division Multiple Access (TDMA). TDMA may allow multiple devices to share a same frequency channel by dividing the transmission of data into different time slots. Each set of receiving and transmitting devices may be assigned one or more slots in a frame of time. For example, a single base station may communicate with sixty-four mobile devices over a period of time, where each mobile device is assigned a slot during which to communicate with the base station. The frame of time may be a repeating structure so that each mobile device communicates at a regular, repeating time interval.

A single frame 102 is illustrated in FIG. 1. The frame is divided into sixty-four slots (e.g., slots 0 through 63). Each slot (e.g., slot 104) is divided into sixty-four packets. Thirty-two of the packets may be for up-link transmission from a mobile computing device to a base station, and thirty-two of the packets may be for down-link transmission from the base station to the mobile computing device. In some examples, each packet time is approximately 17 microseconds, which yields a slot time of approximately 1.08 milliseconds.

The communication system may support multiple transmission rates at the physical layer. For example, a sending computing device may transmit at 16, 24, 32, 48, 64, 96, 128, 192, and 256 bytes per-packet. For example, the packet 106 may be divided into a quantity (N) of bytes based on the transmission rate. While the quantity of bytes may change, the time period of packet transmission may remain the same (e.g., approximately 17 microseconds). Each packet may include a same-sized packet header 108 (e.g., a MAC packet header), regardless of the packet length. Therefore, the effective size of data that is transmitted may be the bytes per-packet minus the header size.

For examples in which multiple devices are communicating during different slots, at least some of the multiple devices may transmit at different data rates. As one example, a first mobile device may receive data at 64 bytes per-packet, a second mobile device may receive data at 192 bytes per-packet, and a third mobile device may receive data at 24 bytes per-packet. The different data transmission rates may correspond to different channel conditions between the mobile devices and a base station.

This disclosure refers to various "levels" of various items. A "level" of a particular item may be a "count" of the particular item or include a "count" of the particular item.

Figure 2:
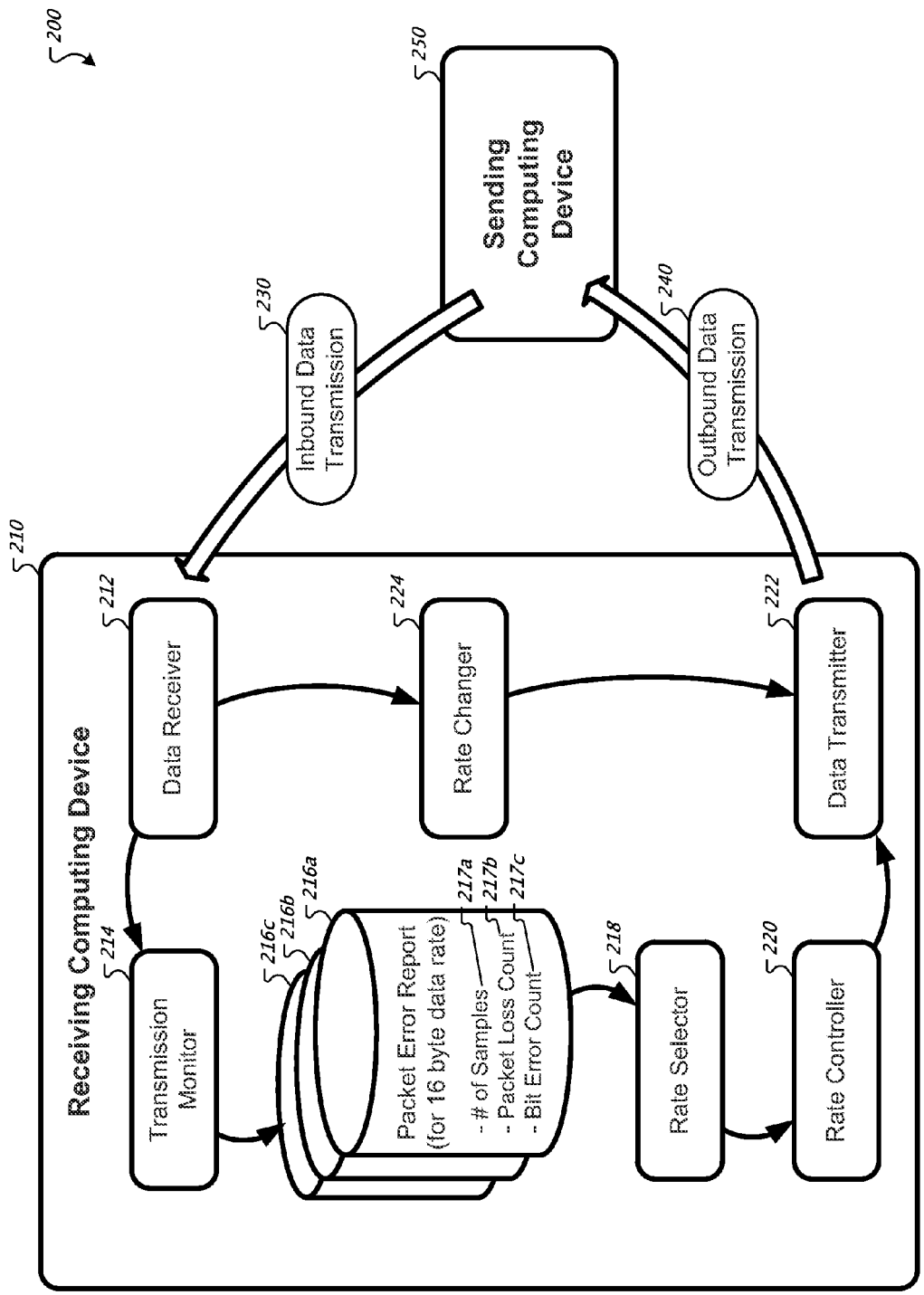
FIG. 2 shows an example system for adapting data rate in a communication system.

FIG. 2 shows an example system for adapting data rate in a communication system. The system 200 includes a receiving device 210 and a sending device 250. Despite the nomenclature, receiving device 210 and sending device 250 can both send and receive data transmissions. Indeed, a process for changing a rate of data transmission from the sending device 250 to the receiving device 210 can include an inbound transmission of data 230 from the sending device 250 to the receiving device 210, an analysis of the transmitted data by the receiving device 210, and a sending, by the receiving device 210 for receipt by the sending device 250, of an instruction to either decrease or increase the rate of the inbound data transmission 230.

In greater detail, the sending computing device 250 may send the inbound data transmission 230 for receipt by the receiving device 210. In some examples, the inbound data transmission 230 may be a wireless transmission of data that is transmitted during a period of time that corresponds to at least a portion of a slot (e.g., slot 104 in frame 102).

The receiving computing device 210 may include a data receiver 212. The data receiver 212 may serve as a physical and/or computational interface for receiving at least some of the inbound data transmission 230 and providing data therefrom to the transmission monitor 214. For example, the data receiver 212 may receive an electrical signal from an antenna of the receiving device 210, may identify a binary sequence of data encoded in the electrical signal, and may provide the binary sequence of data to the transmission monitor 214.

The receiving computing device 210 may include a transmission monitor 214. The transmission monitor 214 may determine a rate of the inbound data transmission 230, analyze a quality of the inbound data transmission 230, and generate statistical information that describes the quality of the inbound data transmission 230. The statistical information may comprise a number of samples 217a (e.g., a number of packets) received since the inbound data transmission 230 switched to a current rate of data transmission, a packet loss count 217b since the inbound data transmission 230 switched to the current rate of data transmission, and a bit error count 217c since the inbound data transmission 230 switched to the current rate of data transmission.

The transmission monitor 214 may store such statistical information in a packet error report that is specific to the rate of the data transmission. For example, if the inbound data transmission 230 has a data rate of sixteen bytes-per-packet, then the statistical information may be stored in a packet error report 216a that is for a sixteen byte-per-packet data rate. The receiving computing device 210 may be able to access packet error reports for other data rates (e.g., packet error reports 216b and 216c for the data rates twenty-four bytes-per-packet and thirty-two bytes-per-packet, respectively).

The statistical information may be generated based on recent packets that have been received at the current rate of the data transmission, to the exclusion of old packets that have been received at the current rate of the data transmission. For example, the transmission monitor 214 may apply a ceiling to the value that can be stored for number of samples field 217a. As such, the transmission monitor 214 may use the most-recent samples that have been received or should have been received at the current data rate in the calculations of the packet loss count 217b and the bit error count 217c.

An example technique for using the most-recent samples is a sliding window mechanism. With such a mechanism, a buffer stores indications of a number of packets that a computing device has received or should have received. The window identifies a consecutive grouping of the packets in the buffer for use in the packet loss count and bit error count calculations. The window grows from zero to multiple packets as packets are received at the current data rate. Once the packet reaches a maximum size, the window effectively slides through the buffer as older indications of packets are removed from a trailing edge of the sliding window and new indications of packets are added to a leading edge of the sliding window.

Figure 3:
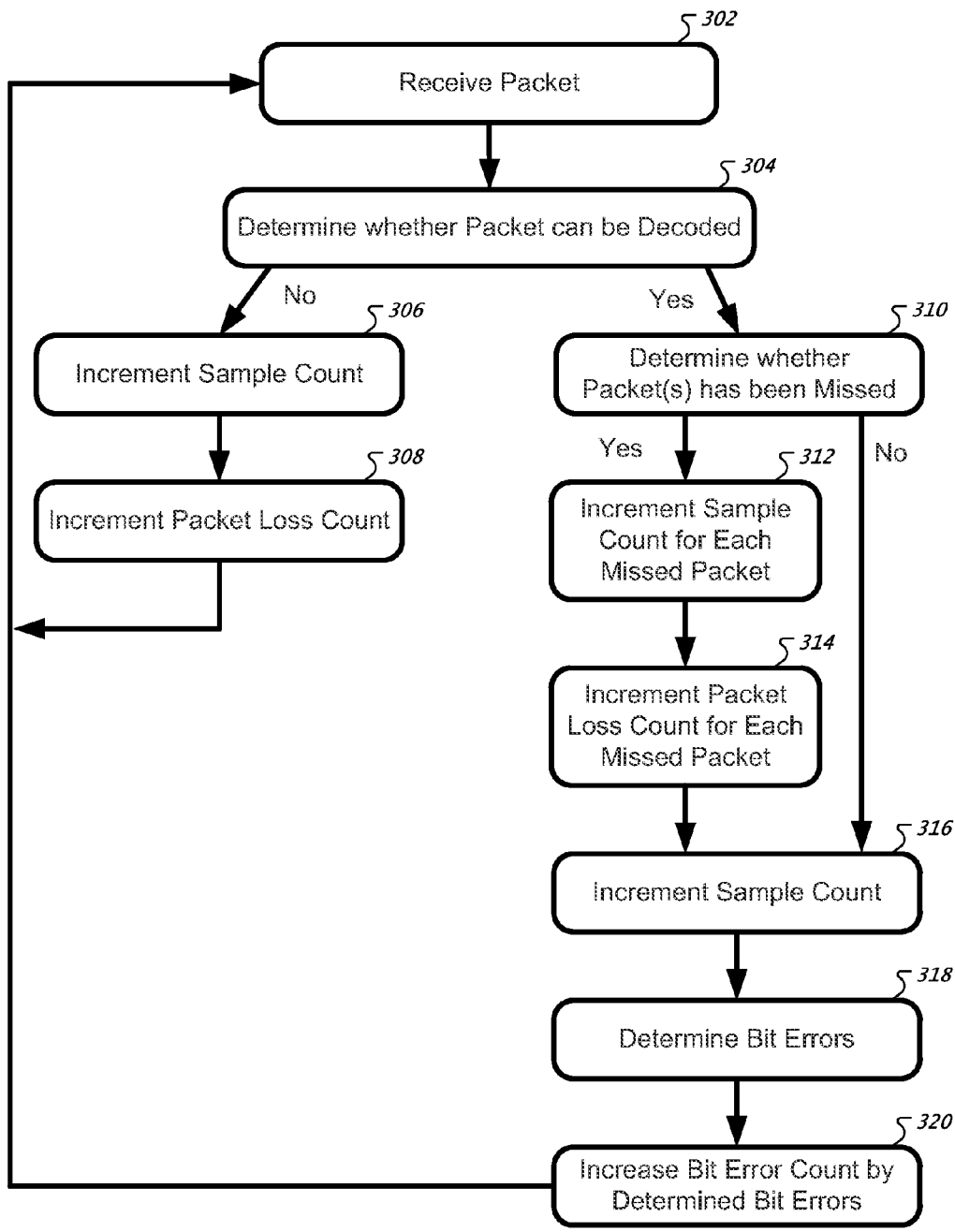
FIG. 3 shows a flowchart of operations for monitoring a data transmission.

The operations of the transmission monitor 214 are described with additional detail throughout this disclosure, for example, with reference to FIG. 3.

The receiving device 210 may include a rate selector 218. The rate selector 218 selects a rate for the inbound data transmission 230. The rate selector 218 may request, from the sending device 250, a decrease in the rate of the inbound data transmission 230 as a result of a determination that the packet loss rate satisfies particular criterion (e.g., that the packet loss count for the current rate of data transmission exceeds a particular threshold). The rate selector 218 may request an increase in the rate of the inbound data transmission 230 as a result of a determination that the bit error count satisfies certain criterion (e.g., that the bit error count for the current rate of data transmission is less than a certain threshold).

Figure 4:
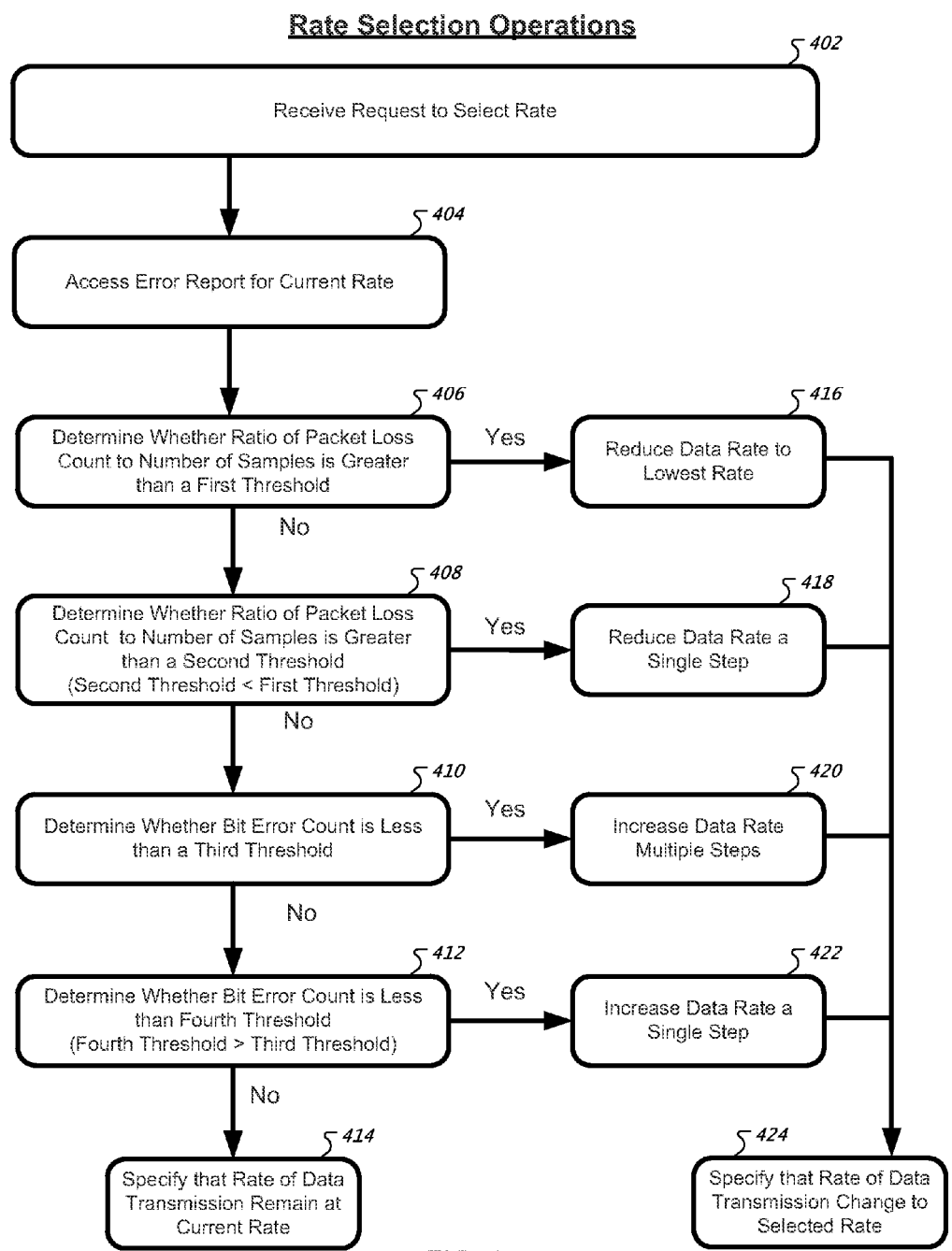
FIG. 4 shows a flowchart of operations for selecting a rate for the data transmission.

The operations of the rate selector 218 are described with additional detail throughout this disclosure, for example, with reference to FIG. 4.

The receiving device 210 may include a rate controller 220. The rate controller 220 may receive an indication that data is designated for transmission to the sending device 250 and, as a result, may request that the rate selector 218 determine a rate at which the sending device 250 should transmit to the receiving device 210. The rate controller 220 may receive the determined rate from the rate selector 218, and may request that the data transmitter 222 include an indication of the determined rate in a packet that is being assembled for transmission to the sending device 250.

The data transmitter 222 may receive, from a queue of data (not shown), data that is designated for transmission to the sending device 250. The data in the queue may include data from a higher-level Open Systems Interconnection model and may include data that identifies the content of user-input text, or may include audio or video captured by the receiving computing device 210. The data received from the queue may have been encoded, for example, with a forward error correction encoding scheme.

The data transmitter 222 may group the queued data into packets that have a size that is specified by information received from the rate changer 224. Specifically, the rate changer 224 may analyze the inbound data transmission 230 to identify, from within the inbound data transmission 230, an instruction that specifies a rate at which the receiving device 210 should transmit data to the sending device 250. The rate changer 224 may provide an indication of the specified rate to the data transmitter 222. The data transmitter 222 may then group the queued data into packets that are sized according to the rate specified in the inbound data transmission 230.

For example, the inbound data transmission 230 may have been transmitted at a rate of sixteen bytes-per-packet, and may include an instruction that the receiving device 210 should transmit data to the sending device 250 at twenty-four bytes-per-packet. The rate changer 224 may identify this instruction in the inbound data transmission 230 and, as a result, provide an indication of the instruction to the data transmitter 222. As such, the data transmitter 222 may configure each packet in the outbound data transmission 240 to include twenty-four bytes.

Three of the bytes in each packet that is transmitted to the sending computing device 250 may be reserved for header information. Accordingly, the data transmitter 222 may select twenty-one bytes of data from the queue of data and group the total collection of twenty-four bytes into a packet. The rate controller 220 may insert an indication of the determined rate into the header of the packet, or may request that the data transmitter 222 insert the indication of the determined rate into the packet. The indication of the determined rate may occupy a single byte or portion of a byte of the header. The indication of the determined rate may be transmitted in the header of each byte in a packet or in a single packet for each slot in a frame. The data transmitter 222 may provide an electrical representation of the packet to an antenna of the receiving device 210 for wireless transmission to the sending device 250 as the outbound data transmission 240.

Figure 5:
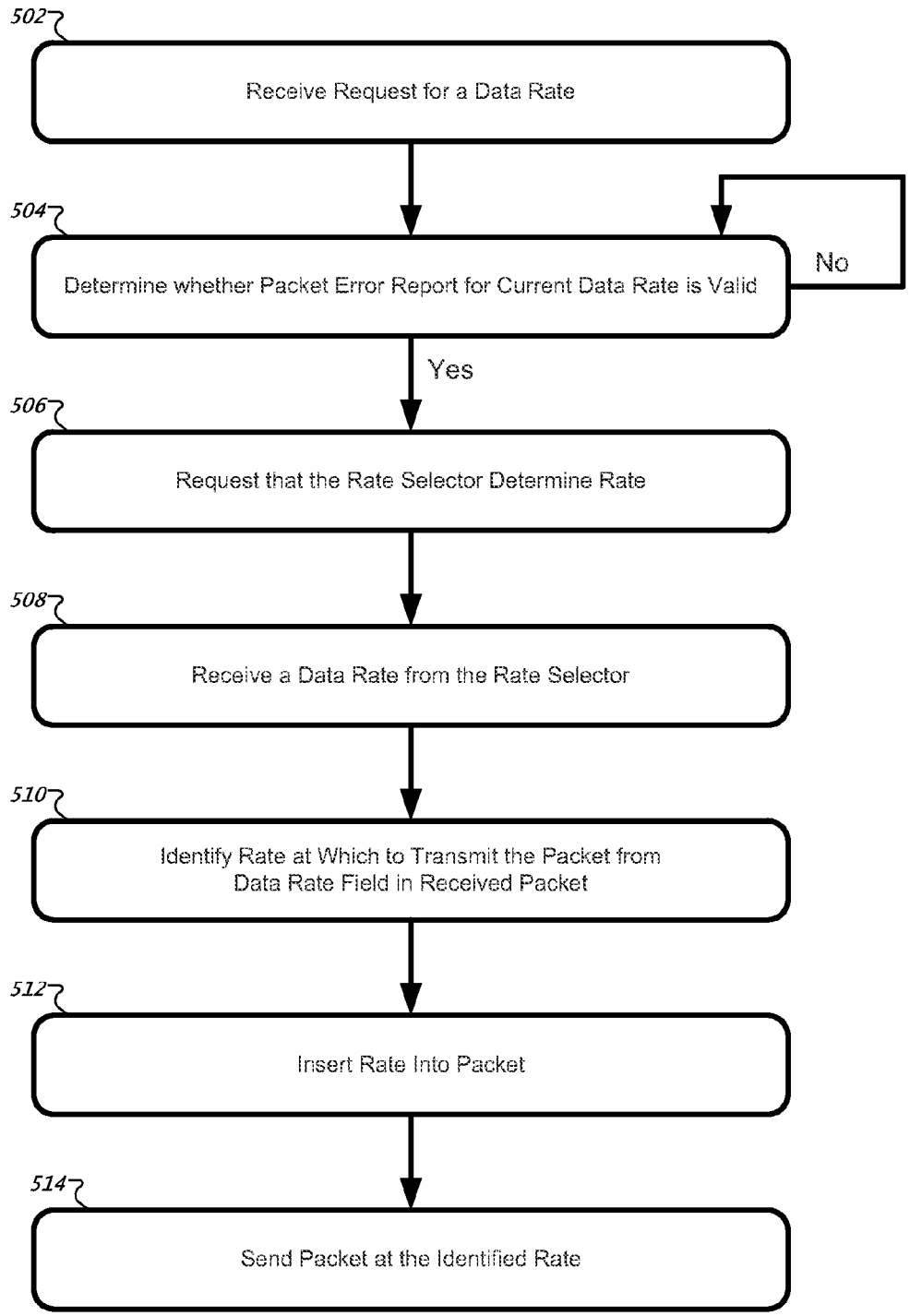
FIG. 5 shows a flowchart of operations for controlling a rate of the data transmission.

The operations of the rate controller 220 and the data transmitter 222 are described with additional detail throughout this disclosure, for example, with reference to FIG. 5.

In some implementations, the sending device 250 and the receiving device 210 may request the rate of data transmissions that are inbound to the devices in a similar manner. For example, although FIG. 2 shows that only the receiving device 210 includes components 212, 214, 216a-c, 218, 220, 222, and 224, the sending device 250 may include corresponding components for determining a rate at the sending device 250 can request that the receiving device 210 transmit data for receipt by the sending device 250. Indeed, rate changer 224 would receive, from the sending device 250, an indication of a rate change, and would request that the data transmitter 222 change the rate of the outbound data transmission 240. As such, the rate of the inbound data transmission 230 may be independent and different from the rate of the outbound data transmission 240. In this example receiving device 210 may be a mobile computing device and sending device 250 may be a base station. Receiving device 210, however, may be a base station and sending device 250 may be a mobile computing device. Both devices may be mobile computing devices.

In some implementations, each of components 212, 214, 216a-c, 218, 220, 222, and 224 are executed by one or more computer programmable processors according to instructions stored by or accessible to the receiving device 210. In some implementations, the inbound data transmission 230 and the outbound data transmission 240 are transmitted between the receiving device 210 and the sending device 250 with an electrical signal on a solid medium (e.g., a wire), with a light signal through a fiber-optic line, or a combination thereof without any wireless electromagnetic transmission through an open medium.

FIG. 3 shows a flowchart of operations for monitoring a data transmission. The operations may be performed by the receiving computing device 210, and more specifically the transmission monitor 214.

At box 302, the transmission monitor 214 receives a data packet. An electrical representation of the data packet may have been transmitted wirelessly by the sending computing device 250 as a portion of the inbound data transmission 230. The data receiver 212 of the receiving computing device 210 may have received an electrical representation of the packet (often referred to herein as simply a packet) with an antenna of the receiving computing device 210. The data receiver 212 may have provided the packet to the transmission monitor 214.

At box 304, the transmission monitor 214 determines whether the received packet can be decoded. In some examples, the transmission monitor 214 may be unable to decode a packet if an error detecting code for the packet is incorrect. In some examples, the transmission monitor 214 may be unable to decode a packet if the system is unable determine the proper value for one or more bits in the packet using an error-correcting code. In some examples, the receiving device transmission monitor 214 determines that a packet includes an error if an abnormality is detected in the received packet (e.g., an absence of a signaling event or a spike in voltage).

At box 306, as a result of determining that the packet cannot be decoded, the transmission monitor 214 increments a sample count (e.g., packet count) for the packet error report of the current data rate. For example, the data rate of the received packet may be sixteen bytes-per-packet. The packet error report 216a for the sixteen bytes-per-packet data rate may include the value "3" for the "number of samples" field 217a, which may indicate that three packets have been received or should have been received since the receiving computing device 210 most-recently began to receive packets at the sixteen bytes-per-packet data rate. The transmission monitor 214 may increase the value of the number of values field 217a by one to the value "4" so as to represent that the statistical information is based on four packets.

At box 308, as a result of determining that the packet cannot be decoded, the transmission monitor 214 increments the packet loss count for the packet error report of the current data rate. Continuing the above example, the packet error report 216a for the sixteen bytes-per-packet data rate may include the value "1" for the "Packet Loss Count" field 217b, which may indicate that one of the three packets that should have been received was lost (e.g., was not received or could or was received but could not be decoded). The transmission monitor 214 may increase the value of the packet loss count field 217b by one to "2" so as to represent that one additional packet has been lost.

At box 310, as a result of determining that a packet can be decoded (e.g., on a subsequent iteration of the process illustrated by the flow chart of FIG. 3), the transmission monitor 214 determines whether one or more packets have been missed. The transmission monitor 214 may determine whether one or more packets have been missed by comparing a sequence number included in a header of the packet received by the operations at box 302 to a sequence number of a previous most-recently-received or processed packet. A packet may have been lost (e.g., due to an obstruction moving between the transmitting device 250 and the receiving device 210) if the sequence number of the received packet is more than one greater than the sequence number of the previous most-recently-received packet. For example, the previous packet may have a sequence number of "39102." A packet may not have been missed if the received packet has a sequence number of "39103." A packet may have been missed if the received packet has a sequence number of "39104" or greater.

At box 312, as a result of a determination that one or more packets have been missed, the transmission monitor 214 increments the sample count for each of the one or more packets that were determined to have been missed, similar in manner to the operations of box 306.

At box 314, as a result of the determination that one or more packets have been missed, the transmission monitor 214 increments the packet loss count for each of the one or more packets that were determined to have been missed, similar in manner to the operations of box 308.

At box 316, in response to a determination that one or more packets have not been missed, or after the operations of boxes 312 and 314, the transmission monitor 214 increments the sample count 316. Accordingly, the transmission monitor 214 may increment the sample count 316 more than once in response to a determination that a packet can be decoded, one time for each packet that was determined to have been missed and one time for the packet that is presently being processed (i.e., the packet that is described as having been received with respect to box 302).

At box 318, as a result of the determination that one or more packets have not been missed, or after the operations of boxes 312 and 314, the transmission monitor 214 determines a quantity of one or more bit errors in the packet that is presently being processed.

The transmission monitor 214 may be able to detect erroneous bits because the communication system 200 may employ forward error correction, a process in which the sending device 250 adds systematically generated redundant data the inbound data transmission 230. The redundancy may allow the receiving device 210 to detect and correct a limited number of errors in the packet without retransmission of the data. The redundancy can be added using a predetermined algorithm. A redundant bit may be a complex function of many original information bits. The original information may be re-coded so as to not literally appear bit-by-bit in the data that is transmitted over the communication channel. In some examples, the forward error correction process that is used is a low-density parity-check (LDPC).

In some examples, if the quantity of erroneous bits in a packet or a number of packets exceeds a specified value (e.g., if more than 40 of 128 bits in a packet have been determined to be incorrect), the transmission monitor 214 indicates that the packet cannot be decoded, for example, as described with respect to box 304. As such, the bit error determination of box 318 may be performed in cooperation with the operations of box 304.

At box 320, the transmission monitor 214 increases the bit error count in the packet error report for the current data rate by the determined quantity of bit errors. For example, the transmission monitor 214 may have determined that the received packet includes four bit errors. The packet error report 216a may have already stored a bit error count of "5" for the two packets that have been received and decoded at the current data rate (two of the four packets have been lost, in this example). As such, the transmission monitor 214 may increase the bit error count to "9".

After the operations of boxes 308 and 320, the process returns to the operations of box 302, at which the transmission monitor 214 awaits the receipt of another packet.

A determination whether a packet is inadequately received can include the above-described determinations whether a packet can be decoded (at box 304) and whether one or more packets have been missed (at box 310). For example, a packet is inadequately received when it is not received at all or is received but not in a usable manner, such as the receiving device not being able to decode the received packet. A packet is adequately received when the packet is received and the receiving device is able to decode the received packet.

The above description of the process for updating the sample count, packet loss count, and bit error count is illustrative and does not represent all variations in which this statistical information can be updated. For example, the transmission monitor 214 may perform the operations in a different order, may process portions of packets independently, may process multiple packets at a single time, and may determine that packets have been missed in other manners, among some examples. In some implementations, instead of a bit error count, the receiving computing device 210 records a byte error count that identifies a quantity of erroneous bytes in the listed quantity of samples.

FIG. 4 shows a flowchart of operations for selecting a rate for the data transmission. The operations may be performed by the receiving computing device 210, and more specifically the rate selector 218.

At box 402, the rate selector 218 receives a request to select a rate at which the inbound data transmission 230 should transmit. The request may be sent by the rate controller 220 as a result of to the rate controller 220 receiving a request that it provide, for transmission to the sending computing device 250, an indication of the selected rate.

At box 404, the rate selector 218 accesses the error report for the current rate. For example, the rate selector 218 may access a field that is set by the transmission monitor 214 and that specifies a current rate of the inbound data transmission 230. In another example, the rate controller 220 provides the rate selector 218 with an indication of the current rate (as described with respect to boxes 504 and 506). The rate selector 218 may select the one of the multiple packet error reports 216a-c that corresponds to the current rate.

At box 406, the rate selector 218 determines whether a ratio of the packet loss count to the number of samples (as specified in the packet error report) is greater than a first threshold. For example, the packet loss count may be two and the number of samples may be twenty-five. The ratio is 0.08, in this example. The first threshold may be 0.1 and, as such, the rate selector 218 may perform the operations of box 408 instead of box 416 since the ratio is not greater than the first threshold. Had the ratio been 0.12, the rate selector 218 may have performed the operations of box 416 sine the ration would have been greater than the first threshold.

At box 416, the rate selector 218 specifies that the rate selector 418 select the lowest data rate (e.g., sixteen bytes from the nine data rates shown in FIG. 1).

At box 408, the rate selector 218 determines whether the ratio of the packet loss count to the number of samples is greater than a second threshold (the second threshold being less than the first threshold). The second threshold in this example may be 0.07 and, as such, the rate selector may perform the operations of box 418 as a result of the ratio being greater than the second threshold.

At box 418, the rate selector 218 specifies that the data rate is to reduce a single step, for example from thirty-two bytes-per-packet to twenty-four bytes per-packet.

In the situation that the ratio was not been greater than the second threshold (e.g., because the threshold was 0.09), the rate selector 218 would have performed the operations of box 410.

At box 410, the rate selector 218 determines whether the bit error count for the current data rate is less than a third threshold. In this example, the bit error count may be thirty-two. The third threshold may be ten and, as such, the rate selector may perform the operations of box 412 since the bit error count is not less than the third threshold. If the third threshold had been forty, the rate selector 218 may have performed the operations of box 420.

At box 420, the rate selector 218 specifies that the rate of the data transmission increase multiple steps (e.g., two steps from thirty-two bytes-per-packet to sixty-four bytes-per-packet).

At box 412, the rate selector 218 determines whether the bit error count is less than a fourth threshold. In this example, the bit error count may be thirty-two and the fourth threshold may be twenty and, as such, the rate selector may perform the operations of box 414.

At box 414, the rate selector 218 specifies that the rate of the inbound data transmission 230 remain at the current rate. The rate selector 218 may send an instruction to the rate controller 220, or may set a value in a field that the rate controller 220 occasionally accesses. The value may specify the current rate. The value may specify that the rate is not to change.

If the fourth threshold had been thirty-three instead of twenty, the rate selector 218 would have performed the operations of box 422 instead of box 414, since the bit error count of thirty-two would have been less than the fourth threshold of thirty-three.

At box 422, the rate selector 218 specifies that the rate of data transmission increase a single step (e.g., one step from thirty-two bytes-per-packet to forty-eight bytes-per-packet).

At box 424, the rate selector 218 specifies that the rate of the data transmission change to the selected rate. As described with respect to box 414, the rate selector 218 may send an instruction to the rate controller 220 or may set a value in a field that the rate controller 220 occasionally accesses.

In some implementations, the rate selection operations described with respect to FIG. 4 include a single option for decreasing the data rate (e.g., the operations of boxes 406 and 416 may not be performed). In some implementations, the rate selection operations include a single option for increasing the data rate (e.g., the operations of boxes 410 and 420 may not be performed). In some implementations, the rate selection operations include more than two options for decreasing the data rate. In some implementations, the rate selection operations include more than two options for increasing the data rate.

In some implementations, one or more of the thresholds (e.g., the first threshold, the second threshold, the third threshold, and the fourth threshold) are the same for multiple data rates. For example, the first threshold may be the same for a data rate of sixteen bytes-per-packet and a data rate of twenty-four bytes-per-packet. The first threshold may be the same for all of the data rates. In some implementations, one or more of the thresholds are different for multiple data rates. For example, the first threshold may be 0.1 for a sixteen bytes-per-packet data rate and 0.09 for a twenty-four bytes-per-packet data rate.

In some implementations, one or more of the thresholds may remain the same for multiple or all iterations of the rate selection operations for a particular data rate. For example, one iteration of the rate selection operations described with respect to FIG. 4 for a data rate of sixteen bytes-per-packet may use a first threshold that remains the same for a second or all subsequent iterations of the rate selection operations for the sixteen bytes-per-packet data rate. As such, the rate selector 218 may be configured to use thresholds that are fixed for each specific data rate.

In some implementations, the operations of boxes 406 and 408 determine whether the packet loss count is greater than a first threshold or a second threshold, respectively, without use of the ratio of the packet loss count to the number of samples. In some implementations the operations of boxes 410 and 412 determine whether a ratio of the bit error count to the number of samples (or a quantity of the number of samples that have been both received and decoded) is less than a third threshold or a fourth threshold, respectively.

FIG. 5 shows a flowchart of operations for controlling a rate of the data transmission. The operations may be performed by the receiving computing device 210, and more specifically the rate controller 220.

At box 502, the rate controller 220 receives a request for a data rate at which the inbound data transmission 230 should transmit. For example, the data transmitter 222 may determine that a slot of a packet, during which the receiving computing device 210 is scheduled to transmit packets as part of the outbound data transmission 240, is approaching and packets of data for transmission during the slot have to be assembled. As a result of such a determination, the data transmitter 222 may send a request for a data rate to the rate controller 220.

At box 504, the rate controller 220 determines whether the packet error report for the current data rate is valid. The packet error report for the current data rate may be valid when the sample count for the current data rate exceeds a threshold value, for example, five packets. As a result of determining that the packet error report for the current data rate is not valid, the rate controller 220 may institute a delay and thereafter perform the operations of box 504 again. The delay may enable the receiving computing device 210 to receive and analyze one or more additional packets from the inbound data transmission 230. As a result of determining that the packet error report for the current data rate is valid, the rate controller 220 may perform the operations of box 506.

In some implementations, the rate controller 220 identifies the current data rate and selects the packet error report for the identified current data rate. In some implementations, the transmission monitor 214 clears a packet error report for a previously-used data rate upon switching packet error reports to record transmission statistics for a new data rate. In some implementations in which the packet error reports for previously-used data rates are cleared, the rate controller 220 may select a single packet error report that has statistical information recorded therein, in distinction to other packet error reports that have been cleared of statistical information. In some implementations, the transmission monitor 214 clears a packet error report for the new data rate upon switching to the new data rate.

At box 506, the rate controller 220 requests that the rate selector 218 determine a rate at which the inbound data transmission 230 should transmit. For example, the rate controller 220 sends a request that is received by the rate selector 218, as described with respect to box 402.

At box 508, the rate controller 220 receives a data rate from the rate selector 218. For example, the rate controller 220 may receive the current rate (as described with respect to box 414) or may receive a rate selected by the rate selector 218 (as described with respect to boxes 416, 418, 420, 422, and 424).

At box 510, the data transmitter 222 identifies a rate at which to transmit one or more packets as part of the outbound data transmission 240. In implementations in which the sending computing device 250 selects a rate at which it is to receive the outbound data transmission 240 (similar to the operations described herein for the receiving computing device 210 to select a rate at which to receive the inbound data transmission 230), the data transmitter 222 identifies a rate that has been selected from a packet of the inbound data transmission 230. An indication of the rate may have been included in a header of the inbound data transmission 230 by the sending computing device 250, and read from the header 230 by the rate changer 224.

At box 512, the rate controller 220 requests that the data transmitter 222 insert an indication of the rate that was selected by the rate selector 218 into one or more packets that are being assembled for transmission to the sending computing device 250. In some examples, the indication of the rate is included in every packet that is sent as part of the outbound data transmission 240. In some examples, the rate is included in one of the multiple packets that is transmitted in a slot (e.g., the first packet in slot 104).

In some implementations, the indication of the rate is a value that identifies the rate. For example, a value of "0" may identify the rate sixteen bytes-per-packet, a value of "1" may identify the rate twenty-four bytes-per-packet, and so forth. In some implementations, the indication of the rate is a value that identifies whether the rate is to increase, decrease, or stay the same. For example, a value of "0" may identify that the rate should decrease, a value of "1" may identify that the rate should stay the same, and a value of "2" may identify that the rate should increase, irrespective of the current rate of data transmission. In some implementations, an indication of the rate is not sent to the sending computing device 250 if the rate is to remain the same. In such implementations, the packet header may use less of the packet size and leave a larger, remaining portion of the packet for the transmission of data. The packet may include one or more bits that identify the type of packet header and thus the size of the packet header.

At box 514, the receiving computing device 210 sends the assembled packet at the rate selected by the rate selector 218. For example, the data transmitter 222 may provide an electrical representation of the assembled packet as a serial signal to an antenna of the receiving computing device 210 for transmission as a wireless electromagnetic signal.

Figure 6:
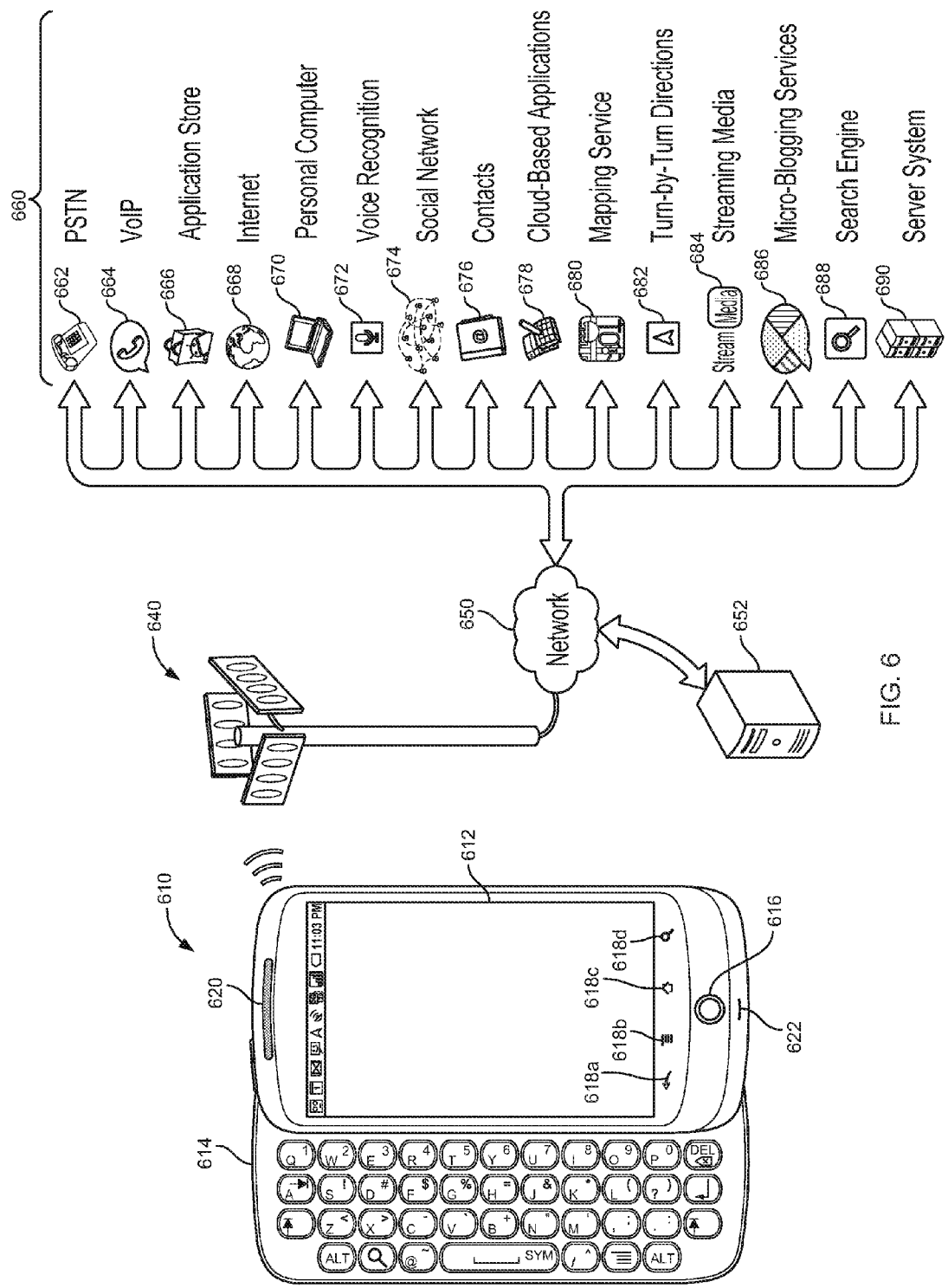
FIG. 6 shows a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device with wireless access to numerous hosted services 660 through a network 650. Mobile computing device 610 may be an example of the receiving device 210 and sending device 250 may be an example of the sending device 250, or vice versa.

In this illustration, the mobile computing device 610 is depicted as a handheld mobile telephone (e.g., a smartphone, or application telephone) that includes a touchscreen display device 612 for presenting content to a user of the mobile computing device 610 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 614, physical buttons, trackballs, accelerometers, gyroscopes, and magnetometers).

Example visual output mechanism in the form of display device 612 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 610. The mobile computing device 610 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
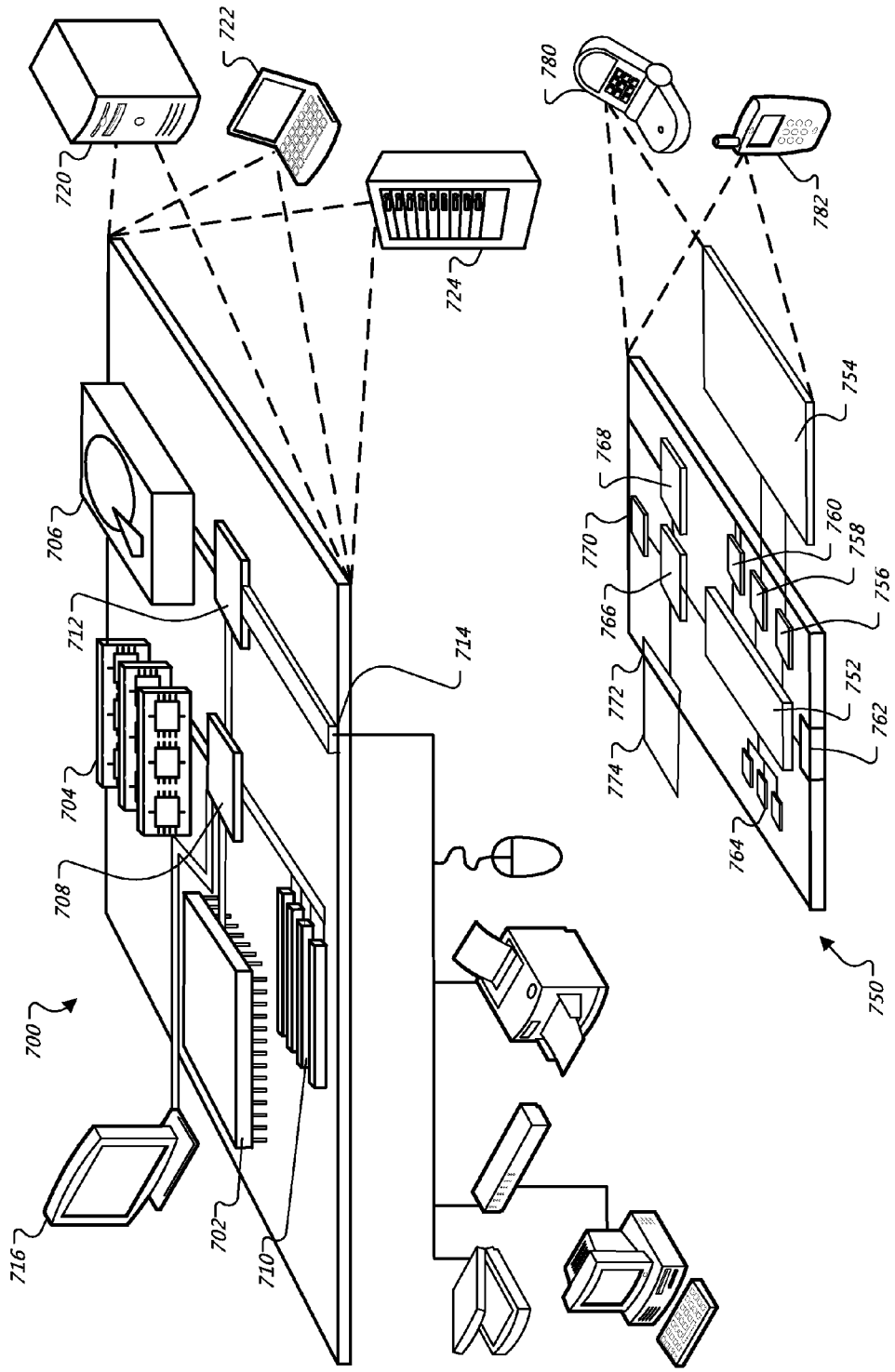
FIG. 7 shows a block diagram of computing devices that may be used to implement the systems and methods described in this document, as either a client or as a server or plurality of servers.

FIG. 7 shows a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for adapting data rate in a communication system, the method comprising:
   receiving, by a receiving computing device, at least a portion of a data transmission that a sending device transmitted at a first data rate;
   identifying, by the receiving computing device, a first quantity of packets in the data transmission that the receiving computing device did not adequately receive at the first data rate, and using the first quantity to increase a packet loss level for the first data rate, the packet loss level for the first data rate identifying a level of packets at the first data rate that the receiving computing device did not adequately receive;
   identifying, by the receiving computing device, a second quantity of improper bits in those packets in the data transmission that the receiving computing device adequately received at the first data rate, and using the second quantity to increase a bit error level for the first data rate, the bit error level for the first data rate identifying a level of bits at the first data rate that have been identified as being improper;
   determining, by the receiving computing device, whether a first value that is based on the packet loss level for the first data rate satisfies a first criterion for reducing the rate of the data transmission;
   determining, by the receiving computing device, whether a second value that is based on the bit error level for the first data rate satisfies a second criterion for increasing the rate of the data transmission; and
   as a result of having determined that the first value does not satisfy the first criterion and that the second value does satisfy the second criterion, sending, by the receiving computing device and for receipt by the sending device, an instruction for causing the sending device to increase the rate of the data transmission.

2. The method of claim 1, further comprising clearing, by the receiving computing device, the packet loss level for the first data rate and the bit error level for the first data rate after receiving at least a portion of the data transmission at the increased rate of the data transmission.

3. The method of claim 1, wherein the first value comprises a first proportion of the packet loss level at the first data rate to a quantity of packets in the data transmission at the first data rate.

4. The method of claim 3, wherein the first criterion is satisfied by the first value being greater than a first threshold value, and is not satisfied by the first value being less than the first threshold value.

5. The method of claim 4, wherein the first proportion does not account for information associated with packets that exceed a certain age.

6. The method of claim 1, wherein:
   the second value comprises the bit error level; and
   the second criterion is satisfied by the second value being less than a second threshold value and is not satisfied by the second value being greater than the second threshold value.

7. The method of claim 6, wherein the bit error level does not account for information associated with packets that exceed a certain age.

8. A computer-implemented method for adapting data rate in a communication system, the method comprising:
   receiving, by a receiving computing device, at least a portion of a data transmission that a sending device transmitted at a first data rate;
   identifying, by the receiving computing device, a first quantity of packets in the data transmission that the receiving computing device did not adequately receive at the first data rate, and using the first quantity to increase a first packet loss level for the first data rate, the first packet loss level identifying a level of packets at the first data rate that the receiving computing device did not adequately receive;
   identifying, by the receiving computing device, a second quantity of improper bits in those packets in the data transmission that the receiving computing device adequately receive at the first data rate, and using the second quantity to increase a first bit error level for the first data rate, the bit error level for the first data rate identifying a level of bits at the first data rate that have been identified as being improper;
   determining, by the receiving computing device, whether a first value that is based on the first packet loss value for the first data rate satisfies a first criterion for reducing the rate of the data transmission;
   as a result of having determined that the first value satisfies the first criterion, sending, by the receiving computing device and for receipt by the sending device, an instruction for causing the sending device to decrease the rate of the data transmission;
   receiving, by the receiving computing device, at least a portion of the data transmission at a second data rate that is lower than the first data rate;
   identifying, by the receiving computing device, a third quantity of packets in the data transmission that the receiving computing device did not adequately receive at the second data rate, and using the third quantity to increase a second packet loss level for the second data rate, the second packet loss level for the second data rate identifying a level of packets at the second data rate that the receiving computing device did not adequately receive;
   identifying, by the receiving computing device, a fourth quantity of improper bits in those packets in the data transmission that the receiving computing device adequately received at the second data rate, and using the fourth quantity to increase a second bit error level for the second data rate, the second bit error level for the second data rate identifying a level of bits at the second data rate that have been identified as being improper;
   determining, by the receiving computing device, whether a third value that is based on the second packet loss level for the second data rate satisfies a third criterion for reducing the rate of the data transmission;
   determining, by the receiving computing device, whether a fourth value that is based on the second bit error level for the second data rate satisfies a fourth criterion for increasing the rate of the data transmission; and
   as a result of having determined that the third value does not satisfy the third criterion and that the fourth value does satisfy the fourth criterion, sending by the receiving computing device and for receipt by the sending device, an instruction for causing the sending device to increase the rate of the data transmission.

9. The method of claim 8, wherein:
   the first value comprises a first proportion of the first packet loss level to a quantity of packets in the data transmission at the first data rate;

the third value comprises a second proportion of the second packet loss level to a quantity of packets in the data transmission at the second data rate; and the fourth value comprises the second bit error level.

10. The method of claim 9, wherein:

the first criterion is satisfied by the first value being greater than a first threshold value and is not satisfied by the first value being less than the first threshold value; and the third criterion is satisfied by the third value being less than a third threshold value and is not satisfied the third value being greater than the third threshold value.

11. The method of claim 10, wherein the fourth criterion is satisfied by the fourth value being less than a fourth threshold value and is not satisfied by the fourth value being greater than the fourth threshold.

12. A receiving computing device, comprising:

a data receiver, executable by one or more processors, that is programmed to receive at least a portion of a data transmission that has been provided by a sending device;

a transmission monitor, executable by the one or more processors, that is programmed to:
  (i) increase a packet loss level for a current rate of the data transmission for each packet in the data transmission that the receiving computing device does not adequately receive, and
  (ii) increase a bit error level for the current rate of the data transmission for each incorrect bit in one or more packets of the data transmission that the receiving computing device adequately received;

a rate selector, executable by the one or more processors, that is programmed to:
  (i) determine whether a first value that is based on the packet loss level for the current rate satisfies a first criterion for decreasing the current rate of the data transmission, and, as a result of a determination that the first value satisfies the first criterion, indicate that the current rate should decrease, and
  (ii) determine whether a second value that is based on the bit error level for the current rate satisfies a second criterion for increasing the current rate of the data transmission, and, as a result of a determination that the second value satisfies the second criterion, indicate that the current rate should increase; and a rate controller, executable by the one or more processors, that is programmed to:
  (i) receive the indication that the current rate should decrease and as a result provide, for receipt by the sending device, an instruction that the sending device decrease the current rate of the data transmission, and
  (ii) receive the indication that the current rate should increase and as a result provide, for receipt by the sending device, an instruction that the sending device increase the current rate of the data transmission.

13. The receiving computing device of claim 12, wherein the rate selector is programmed to indicate that the current rate should increase as a result of a determination that the first value does not satisfy the first criterion and the determination that the second value satisfies the second criterion.

14. The receiving computing device of claim 12, wherein:

the first value comprises a proportion of the packet loss count for the current data rate to a quantity of packets in the data transmission at the current data rate; and the second value comprises the bit error level for the current data rate.

15. The receiving computing device of claim 14, wherein:

the first criterion is satisfied by the first value being greater than a first threshold value and is not satisfied by the first value being less than the first threshold value; and the second criterion is satisfied by the second value being less than a second threshold value and is not satisfied by the second value being greater than the second threshold value.

16. The receiving computing device of claim 12, wherein the receiving computing device is programmed so that, in response to the rate controller including the instruction in the data transmission:
  (a) the data receiver is programmed to receive the data transmission with the current rate as having either decreased or increased;
  (b) the transmission monitor is programmed to increase the packet loss level and increase the bit error level for the data transmission with the current rate that has either decreased or increased;
  (c) the rate selector is programmed to determine whether the first criterion is satisfied and determine whether the second criteria is satisfied; and
  (d) the rate controller is programmed to provide for receipt by the sending device another instruction that the sending device either decrease or increase the current rate of the data transmission that has already either decreased or increased.

17. The receiving computing device of claim 12, wherein the transmission monitor maintains the packet loss level for a sliding window of recent packets for the current rate of the data transmission.

18. The receiving computing device of claim 12, wherein the transmission monitor maintains the bit error level for a sliding window of recent packets for the current rate of the data transmission.

19. The receiving computing device of claim 12, wherein the current rate of the data transmission is one of multiple rates of the data transmission, wherein the multiple rates of the data transmission specify different quantities of bytes that the receiving device is configured to receive in a packet that is fixed in length of transmission time.

* * * * *